UNITED STATES PATENT OFFICE.

HERBERT J. BREEZE, OF PORTLAND, OREGON.

TIRE-FILLING COMPOUND.

1,015,133.     Specification of Letters Patent.     Patented Jan. 16, 1912.

No Drawing.     Application filed January 4, 1910. Serial No. 536,280.

*To all whom it may concern:*

Be it known that I, HERBERT J. BREEZE, citizen of the United States, residing at Portland, in the county of Multnomah and State of Oregon, have invented new and useful Improvements in Tire-Filling Compounds, of which the following is a specification.

My invention relates to tire-filling compounds, and consists in a compound made up of the following ingredients, combined in the proportions stated, viz:

Glue _____ One pound.
Syrup _____ Two pounds.
Glycerin _____ One-half ounce.
Rosin _____ One-half ounce.
Beeswax _____ One-half ounce.

In preparing the compound the syrup, preferably sugar-cane syrup, is first reduced to a boiling state, and then the glue is added, a small portion at a time, until the entire quota of glue is dissolved in and thoroughly commingled with the syrup. The glycerin, rosin and beeswax are then added and the temperature of the mixture is raised to 260 degrees F. when the compound is ready to be put in tires.

The hot compound is forced under pressure into a tire to be filled and when cooled it becomes a solid body possessed of elasticity or springiness and adapted to retain such quality until the tire casing is completely worn out. From this it follows that the filled tire will retain its shape under all conditions and will be possessed of the same resiliency and cushioning capacity as a tire filled with air under pressure; also, that punctures of the tire casing will not detract from the springiness of or otherwise affect the tire, and that when the tire is filled with the compound the necessity of pumping up the tire at intervals is done away with.

The practical advantages of my novel tire will be better appreciated when it is stated that the glue and syrup form the main solid body, the glycerin prevents the compound from adhering to the inner side of the tire casing, and the rosin and beeswax serve to temper the compound and to prevent shrinking thereof.

The glycerin in the comparatively small proportion stated—namely, one-half ounce, serves to efficiently perform the function ascribed to it without interfering with the solidity of the main body of glue and syrup, and this is true also of the comparatively small proportions of rosin and beeswax. I would also say that experience has demonstrated that the composition composed of two parts of syrup to one part of glue, together with the comparatively small proportions of glycerin, rosin and beeswax, is adapted to retain its elasticity or springiness for an indefinite period, and that therefore the composition forms an efficient and otherwise desirable filler for tires.

Having described my invention, what I claim and desire to secure by Letters-Patent, is:

The herein described compound consisting of a cooked mixture of one pound of glue, two pounds of syrup, and glycerin, rosin, and beeswax, in the proportions of one-half ounce, each.

In testimony whereof I have hereunto set my hand in presence of two subscribing witnesses.

HERBERT J. BREEZE.

Witnesses:
GEORGE PHILLIPS,
DAVID A. LONG.